March 18, 1952     G. L. KITSON ET AL     2,589,706

CHAIN DISTRIBUTOR TYPE POULTRY FEEDING DEVICE

Filed Aug. 14, 1947     2 SHEETS—SHEET 1

INVENTORS
CHARLES H. KITSON and GERALD L. KITSON
BY Glenn B. Morse
ATTORNEY

March 18, 1952
G. L. KITSON ET AL
2,589,706
CHAIN DISTRIBUTOR TYPE POULTRY FEEDING DEVICE
Filed Aug. 14, 1947
2 SHEETS—SHEET 2
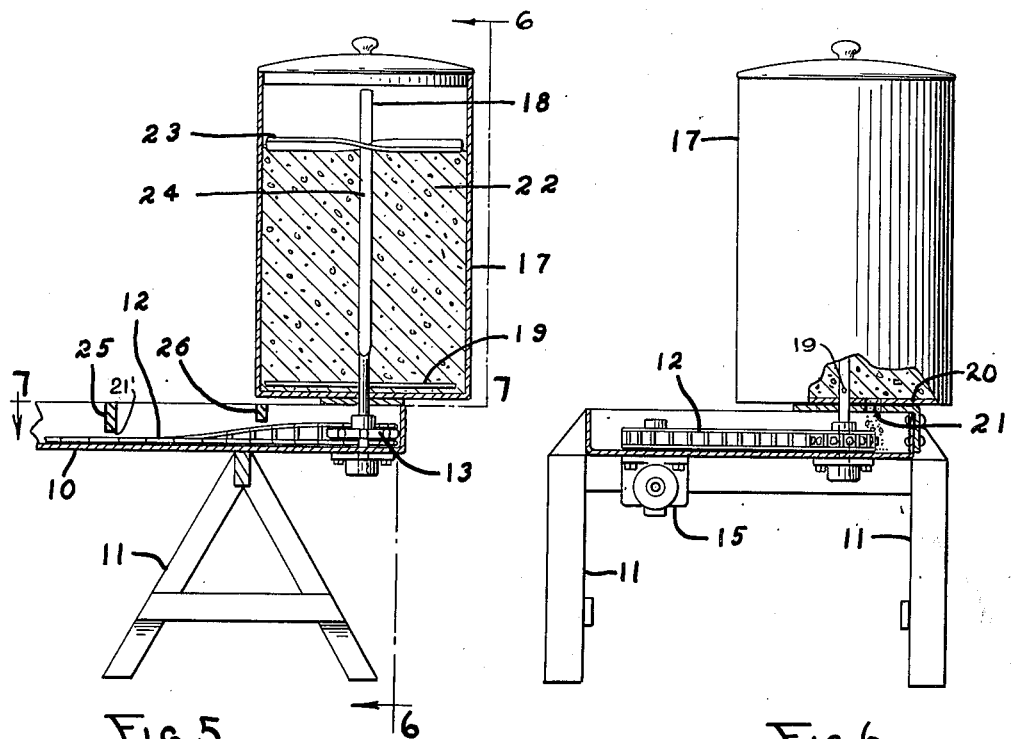
Fig. 5.
Fig. 6.
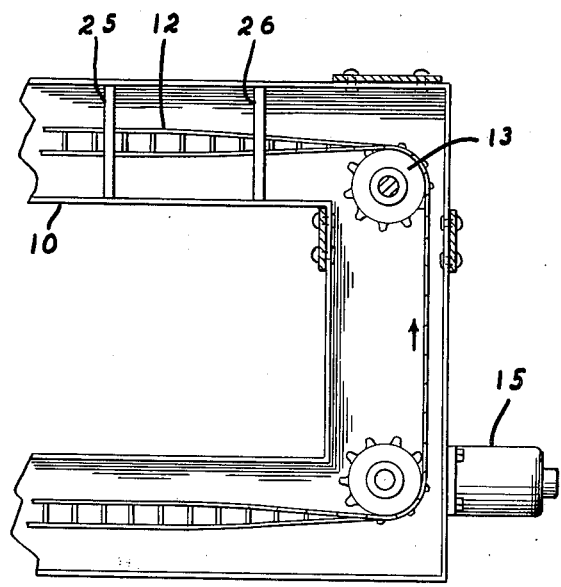
Fig. 7.
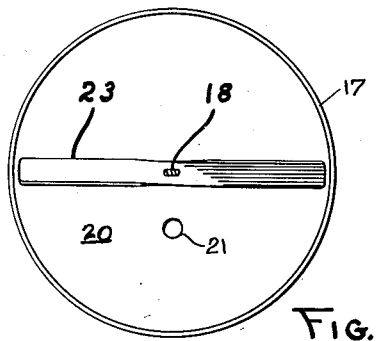
Fig. 8.
INVENTORS:
CHARLES H. KITSON
and GERALD L. KITSON
BY Glenn B. Morse
ATTORNEY

UNITED STATES PATENT OFFICE 2,589,706

CHAIN DISTRIBUTOR TYPE POULTRY FEEDING DEVICE

Gerald L. Kitson and Charles H. Kitson, Rockford, Mich., assignors, by mesne assignments, of one-half to themselves and Leon Kitson, jointly, with full rights of survivorship, and one-half to Nat Cordis, Chicago, Ill.

Application August 14, 1947, Serial No. 768,554

13 Claims. (Cl. 119—52)

This invention is associated with poultry feeding devices. This type of equipment has the twofold purpose of measuring out feed at a definite rate and of distributing it about a trough or other container which is designed to accommodate a large group of fowls. This equipment is principally a labor saving systems.

The present invention provides a trough which is preferably formed as conduit means in a closed circuit, and so located relative to the ground that chickens and other fowls may have access to the open side of the trough to obtain feed therefrom. The trough is provided with means for distributing feed which is supplied preferably from one point in the closed circuit mentioned above. Having in mind the difficulties in the forming of sheet metal, it is preferable to form this circuit in a rectangular pattern of suitable dimensions for the particular number of fowls it is desired to feed. Regardless of the dimensions of the aforementioned rectangle, the size of the trough from which the rectangle is made will remain substantially the same.

The distribution of the feed within the trough is preferably accomplished by the use of a simple chain, although any similar tension device may be used. Suitable guiding means are provided which cause the chain to follow the circuit of the trough, and allow it to drag across the bottom of the trough over the greater portion of the circuit. The movement of the links of the chain along the floor of the feed trough urges the grain or other feed along the circuit causing a uniform distribution therein, thus removing the necessity for laboriously spreading such feed by hand.

The preferred arrangement for supplying feed to the distributing system outlined above comprises a storage hopper which is fitted with agitating means driven by the distributing chain. Motion is of course imparted to the said distributing chain by a suitable driving motor at a convenient location within the circuit, preferably at one of the guiding sprockets which determine the course of the chain.

The preferred form of the agitating means used within the storage hopper comprises a vertical shaft. A transverse member is attached to this shaft and rotates therewith a short distance above the floor of the said hopper. This action causes the feed which is stored within the hopper to be gradually worked through a small hole in the hopper which is directly above a portion of the said trough. To cause the upper level of the stored feed within the hopper to remain substantially flat, a second agitating member is associated with the vertical shaft which operates on top of the stored feed and prevents accumulation of the feed near the side of the hopper. In the preferred form of the present invention this upper agitating member is driven through the engagement of a flattened portion of the vertical shaft with a mating aperture in the transverse agitating member. With this arrangement it is clear that the upper agitator is free to slide axially with respect to the vertical shaft, leaving its position thereon to be determined by the amount of feed within the hopper. It has been found practical to apply a twist to the upper agitating member to impart a propeller-like form thereto which causes it to work upwardly within the feed and to remain at the top where its action is best performed.

A modified hopper arrangement is also provided by the present invention which does not make use of special working parts associated therewith. This modified hopper is essentially a section of the feed through which is formed by suitable partitions therein in which a supply of feed may be placed. These transverse partitions within the feed through are provided with suitable apertures near the floor of said trough for the passage of the distributing chain. The size of the aperture at the outlet of the trough is regulated to give the desired depth of the stream of feed. With this arrangement the only agitating is that caused by the passage of the chain through the lower portion of the storage bin.

The invention as outlined above will be explained in detail by a discussion of the particular embodiments which are illustrated in the accompanying drawings in which:

Fig. 5 illustrates, on an enlarged scale, a section along the plane 5—5 of Fig. 1 and depicts an additional hopper means.

Fig. 6 is a section along the plane 6—6 of Fig. 5 wherein a portion of the hopper has been broken away for clarity.

Fig. 7 is a section, on a further enlarged scale, along the plane 7—7 of Fig. 5.

Fig. 8 illustrates, also on a further enlarged scale, the preferred form of the upper agitating member which operates within the hopper, the cover of said hopper having been removed.

Figure 1:
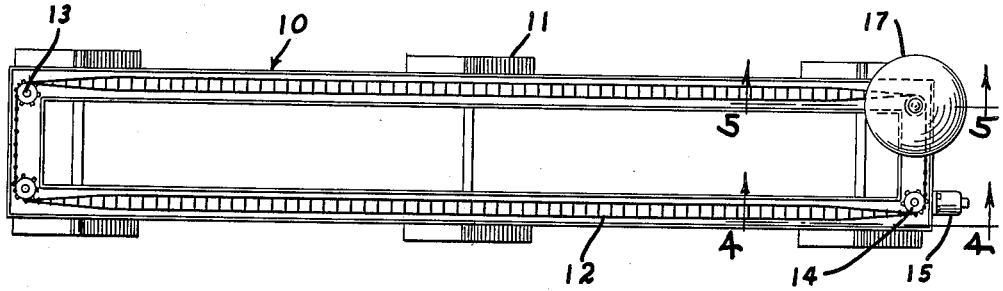
Fig. 1 is a plan view of the entire distributing system showing the drive means and supply hopper in position.

Referring to Fig. 1, the trough system 10, constituting conduit means, is shown formed in the shape of a long and narrow rectangle. The trough system 10 is supported upon the horses 11 which may, if desired, be provided with special platforms (not shown) acting as perches for fowls which are to feed at the trough. If such platforms are not provided, the height of the horses 11 must be such as to permit the fowls to reach the feed trough from the ground.

Feed is distributed within the trough system 10 by means of the conveying chain 12, the course of which is determined by the sprockets 13 located at the corners of the trough system. Motion is imparted to the conveying chain 12 by means of the driving sprocket 14 which receives power from the electric motor and gear box unit 15. Energy is supplied to the unit 15 by means of the electric conduit 16.

Figure 2:
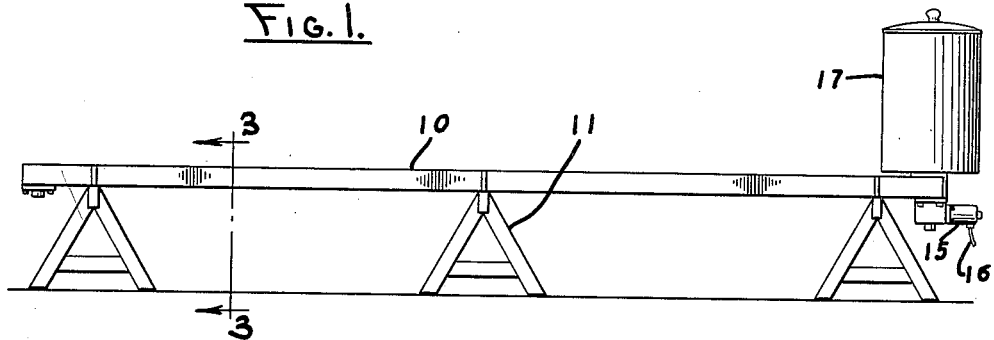
Fig. 2 is an elevation of the same device as illustrated in Fig. 1.

In the preferred form of the invention shown in Figs. 1 and 2, the storage hopper 17 is located with its axis coincident with the axis of the corner sprocket which determines the course of the conveyor chain 12. In this manner, it is possible for power to be supplied from the unit 15 to the storage hopper agitating means through the conveying chain 12.

Figure 4:
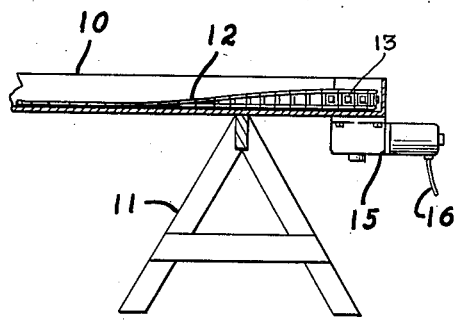
Fig. 4 illustrates, on an enlarged scale, a section along the plane 4—4 of Fig. 1.
Figure 3:
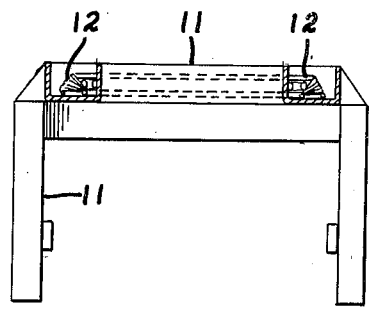
Fig. 3 illustrates, on an enlarged scale, a section along the plane 3—3 of Fig. 2.

Referring to Figs. 3 and 4, it is seen that the chain 12 assumes a vertical position as it approaches any one of the corner sprockets 13 or the driving sprocket 14, and that between these points slack in the chain 12 permits the links to lie flat along the bottom of the trough 10. It is of course clear that with the links of chain 12 lying flat along the bottom of the trough that feed in very small quantities may be handled by the distributing system.

The hopper or storage system utilized in connection with the present invention is illustrated in Figs. 5, 6, 7 and 8. Referring to Fig. 5, the hopper system is shown structurally supported by the trough system 10 which acts in the preferred form of the invention as a cantilever beam. It is clear in Fig. 5 that the corner sprocket 13 is fixed with respect to vertical shaft 18, the shaft 18 being the means through which power is transferred to the agitating system within the hopper. This agitating system comprises the lower transverse member 19 which is fixed with respect to shaft 18 and consequently rotates therewith. It is noted that the lower transverse member 19 rotates in a plane slightly above the floor 20 of the hopper 17. The movement of this transverse member 19 in close proximity to the floor 20 of the hopper causes the feed to move through the discharge outlet or supply port 21 in the floor 20 of the hopper 17.

If the lower transverse member 19 were the only active part in the agitating system, a gradual withdrawal of the feed through the supply port 21 would normally cause the upper surface of the stored feed 22 to assume a concave curvature which at times would inhibit the smooth flow of feed through the supply port 21. To maintain the upper surface of the feed 22 in a substantially plane surface, the upper agitating member 23 is provided. The upper agitating member 23 is driven through the engagement of a flattened portion 24 of the vertical shaft 18 with a suitable mating aperture in the agitating member 23. In this manner, member 23 is fixed against rotation with respect to vertical shaft 18, but is permitted considerable axial movement thereon. It follows that as shaft 18 rotates, the upper agitating member 23 is supported by the combination of the frictional resistance of member 23 to movement along vertical shaft 18 and the supporting effect of the feed. As the stored feed 22 is withdrawn through the supply port 21, the torque required to drive the upper agitating member 23 at a given point on shaft 18 is gradually released to the point where gravity overcomes the resistance of member 23 to slide along shaft 18. In this way the formation of a concave surface from the top of the stored feed 22 is substantially prevented. The tendency for the upper agitating member 23 to work downward in the feed 22 may be inhibited by imparting a twist to the member 23 creating a pair of surfaces which are inclined to its plane of rotation. This twist is applied in a direction relative to the rotation of the shaft such that the member 23 tends to move upwardly through the feed 22.

A simplified additional hopper of convenient size is illustrated in Fig. 5 which comprises the section of trough defined by the partitions 25 and 26. It is clear that a quantity of feed may be poured into the trough at this point and that the partition 25 (which may be termed the outlet side) providing a discharge outlet 21', defines the depth of the stream of feed which is admitted to the remainder of the trough. With this arrangement, the only agitating effects are those due to the passage of the conveying chain 12 through the bottom of the storage bin.

The invention for which protection is sought under the appended claims is not to be construed as limited by the illustrations of the particular embodiments which appear in the accompanying drawings. The invention claimed is as follows:

1. A stock feeder comprising a hopper having a discharge outlet, continuous conduit means formed in a closed circuit disposed in a substantially horizontal plane and communicating with said discharge outlet, said conduit means comprising an open-top horizontal trough affording access by stock to feed contained therein, endless flexible distributing means extending substantially throughout said conduit means adjacent the bottom thereof for conveying feed from said hopper and distributing said feed substantially throughout the length of said trough, said distributing means having a maximum cross section substantially less than the cross section of said trough, and driving means operatively associated with said distributing means for advancing said distributing means through said conduit means.

2. A stock feeder comprising a hopper having a discharge outlet, continuous conduit means formed in a closed circuit disposed in a substantially horizontal plane and communicating with said discharge outlet, said conduit means comprising an open-top horizontal trough affording access by stock to feed contained therein, endless flexible distributing means extending substantially throughout said conduit means adjacent the bottom thereof for conveying feed from said hopper and distributing said feed substantially throughout the length of said trough and having a maximum width and cross section substantially less than the width and cross section respectively of said trough, and driving means operatively associated with said distributing means for advancing said distributing means through said conduit means.

3. A stock feeder comprising a hopper having a discharge outlet, continuous conduit means formed in a closed circuit disposed in a substantially horizontal plane and communicating with said discharge outlet, said conduit means comprising an open-top horizontal trough affording access by stock to feed contained therein, endless flexible distributing means traversing at least a portion of the bottom of said hopper and extending substantially throughout said conduit means adjacent the bottom thereof for conveying feed from said hopper and distributing said feed substantially throughout the length of said trough, said distributing means having a maximum cross section substantially less than the cross section of said trough, and driving means operatively associated with said distributing means for advancing said distributing means through said conduit means.

4. A stock feeder comprising a hopper having a discharge outlet, conduit means communicating with said discharge outlet, said conduit means comprising an open-top horizontal trough affording access by stock to feed contained therein, endless flexible distributing means extending substantially throughout said conduit means adjacent the bottom thereof for conveying feed from said hopper and distributing said feed substantially throughout the length of said trough, agitating means effective upon feed in said hopper, driving means operatively associated with said distributing means for advancing said distributing means through said conduit means, and power take-off means operatively associated with said distributing means and adapted to drive said agitating means.

5. A stock feeder comprising a hopper having a discharge outlet, a rotary agitator supported within said hopper for rotation on a vertical axis, continuous conduit means formed in a closed circuit disposed in a substantially horizontal plane and communicating with said discharge outlet, said conduit means comprising an open-top horizontal trough affording access by stock to feed contained therein, endless flexible distributing means extending substantially throughout said conduit means adjacent the bottom thereof for conveying feed from said hopper and distributing said feed substantially throughout the length of said trough, said distributing means having a maximum cross section substantially less than the cross section of said trough, driving means operatively associated with said distributing means for advancing said distributing means through said conduit means, and power take-off means connected with said distributing means and driving said agitator.

6. A stock feeder comprising a hopper having a discharge outlet, a rotary agitator supported within said hopper, conduit means communicating with said discharge outlet, said conduit means comprising an open-top horizontal trough affording access by stock to feed contained therein, endless flexible distributing means extending substantially throughout said conduit means adjacent the bottom thereof for conveying feed from said hopper and distributing said feed substantially throughout the length of said trough, driving means operatively associated with said distributing means for advancing said distributing means through said conduit means, and power take-off means connected with said distributing means and driving said agitator.

7. A stock feeder comprising a hopper having a discharge outlet, continuous conduit means formed in a closed circuit disposed in a substantially horizontal plane and communicating with said discharge outlet, said conduit means comprising an open-top horizontal trough affording access by stock to feed contained therein, endless flexible distributing means extending substantially throughout said conduit means adjacent the bottom thereof for conveying feed from said hopper and distributing said feed substantially throughout the length of said trough, said distributing means having a maximum cross section substantially less than the cross section of said trough, agitating means effective upon feed in said hopper, and driving means operatively associated with said distributing means for advancing said distributing means through said conduit means, and power take-off means operatively associated with said distributing means and adapted to drive said agitating means.

8. A stock feeder comprising a hopper having a discharge outlet, conduit means communicating with said discharge outlet, said conduit means comprising a plurality of connected open-top trough sections meeting at an angle in a substantially horizontal plane and affording access by stock to feed contained therein, at least one endless chain composed of substantially co-planar links extending substantially throughout said conduit means adjacent the bottom thereof for conveying feed from said hopper and distributing said feed substantially throughout the length of said trough sections and having a maximum cross section substantially less than the cross section respectively of said trough, sprocket means adapted to receive said chain and mounted for rotation on a vertical axis at the points of connection of said trough sections, and driving means operatively associated with said distributing means for advancing said distributing means through said conduit means.

9. A stock feeder comprising a hopper having a discharge outlet, continuous conduit means formed in a closed circuit disposed in a substantially horizontal plane and communicating with said discharge outlet, said conduit means comprising an open-top horizontal trough affording access by stock to feed contained therein, at least one endless chain composed of substantially coplanar links and extending substantially throughout said conduit means adjacent the bottom thereof for conveying feed from said hopper and distributing said feed substantially throughout the length of said trough, said distributing means having a maximum cross section substantially less than the cross section of said trough, and driving means operatively associated with said distributing means for advancing the distributing means through said conduit means.

10. A stock feeder comprising a hopper having a discharge outlet, continuous conduit means defining a closed polygon in horizontal plan communicating with said discharge outlet, said conduit means comprising an open-top horizontal trough affording access by stock to feed contained therein, endless flexible distributing means extending substantially throughout said conduit means adjacent the bottom thereof for conveying feed from said hopper and distributing said feed substantially throughout the length of said trough, said distributing means having a maximum cross section substantially less than the cross section of said trough, sprocket means adapted to receive said flexible distributing means and mounted for rotation on a vertical axis at the corners of said polygon, and driving means operatively associated with said distributing means for advancing said distributing means through said conduit means.

11. A stock feeder comprising a hopper having a discharge outlet, a rotary agitator supported within said hopper for rotation on a vertical axis, continuous conduit means defining a closed polygon in horizontal plan communicating with said discharge outlet, said conduit means comprising an open-top horizontal trough affording access by stock to feed contained therein, endless flexible distributing means extending substantially throughout said conduit means adjacent the bottom thereof for conveying feed from said hopper and distributing said feed substantially throughout the length of said trough, said distributing means having a maximum cross section substantially less than the cross section of said trough, sprocket means adapted to receive said flexible distributing means and mounted for rotation on a vertical axis at corners of said polygon, driving means operatively associated with said distributing means for advancing said distributing means through said conduit means, and power take-off means connected with at least one of said sprocket means and adapted to drive said rotary agitator.

12. A stock feeder comprising a hopper having a discharge outlet, continuous conduit means formed in a closed circuit disposed in a substantially horizontal plane and communicating with said discharge outlet, said conduit means comprising an open-top horizontal trough affording access by stock to feed contained therein, endless flexible distributing means extending substantially throughout said conduit means adjacent the bottom thereof for conveying feed from said hopper and distributing said feed substantially throughout the length of said trough, said distributing means having a maximum cross section substantially less than the cross section of said conduit, and driving means operatively associated with said distributing means for advancing said distributing means through said conduit means.

13. A stock feeder comprising a hopper having a discharge outlet, continuous conduit means formed in a closed circuit disposed in a substantially horizontal plane and communicating with said discharge outlet, said conduit means comprising an open-top horizontal trough affording access by stock to feed contained therein, endless flexible distributing means extending substantially throughout said conduit means adjacent the bottom therefor for conveying feed from said hopper and distributing said feed substantially throughout the length of said trough, said distributing means having a maximum width and cross section substantially less than the width and cross section respectively of said conduit, and driving means operatively associated with said distributing means for advancing said distributing means through said conduit means.

GERALD L. KITSON.
CHARLES H. KITSON.

REFERENCES CITED

The following references are of record in the file of this patent:

UNITED STATES PATENTS

| Number | Name | Date |
|---|---|---|
| 98,412 | Pry | Dec. 28, 1869 |
| 238,637 | Blevin | Mar. 8, 1881 |
| 460,202 | Eberhardt | Sept. 29, 1891 |
| 853,652 | Steele | May 14, 1907 |
| 1,068,176 | Scott | July 22, 1913 |
| 1,977,513 | Holbeck | Oct. 16, 1934 |